Oct. 10, 1939.  H. L. DICK  2,175,256
FILTER
Filed May 24, 1937
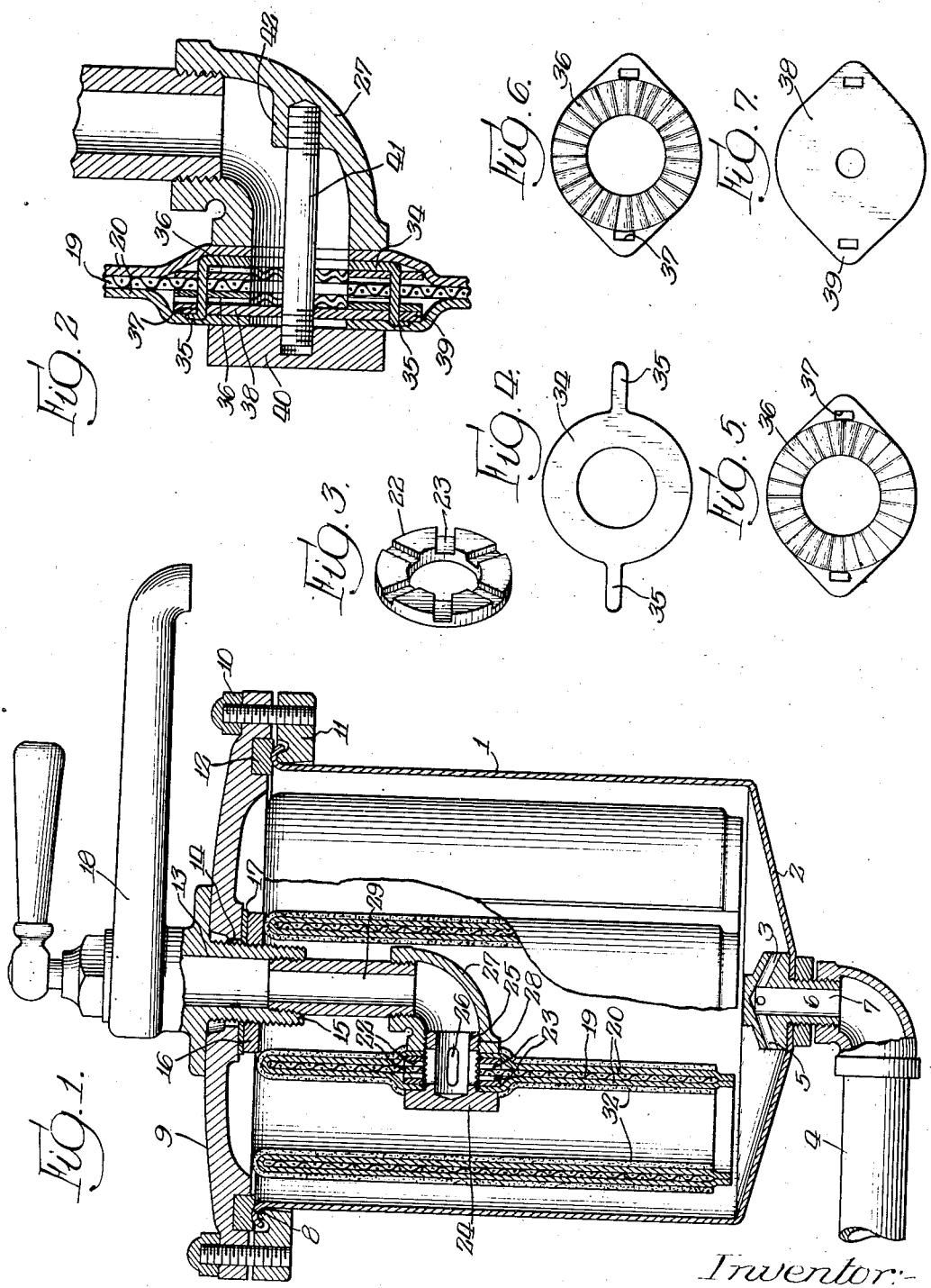
Inventor:-
Herbert L. Dick,
By Cromwell, Greist & Warden
Attys.

Patented Oct. 10, 1939

2,175,256

UNITED STATES PATENT OFFICE 2,175,256

FILTER

Herbert L. Dick, Chicago, Ill.

Application May 24, 1937, Serial No. 144,327

3 Claims. (Cl. 210—181)

The present invention relates to filters and has particular reference to improvements in filters of the type especially adapted for use in purifying water for drinking purposes, and the like. This is a continuation in part of my application Serial No. 616,381 filed June 10, 1932.

The water of most municipal systems contains relatively large quantities of various impurities, such as organic matter, dirt, chemicals such as chlorine, and even bacteria, which impart a disagreeable color, taste, and odor to the water, thereby rendering it undesirable for drinking purposes.

Various attempts have been made to provide a filter which may be used to purify water for household consumption. For example, stone filters have been employed in this connection for some time. Stone filters are objectionable for several reasons, including their relatively slow rate of flow, necessity for frequent cleaning, and failure to eliminate color, taste and odor from the water.

A principal object of the present invention is to provide an improved method and apparatus for the purification of water or other liquids.

A further object is to provide a pressure filter which will effectively remove color, taste, and odor from water, as well as impurities such as suspended solids and colloids.

A still further object is to provide an improved filtering element and method for making the same.

Another object is to provide a filter of the household type in which the raw water is forced under pressure through a layer of a charge of prepared solids hydrostatically deposited upon a filter charge retainer such as cloth, paper or other retainers known in the art.

Still another object is the provision of a filter having a large filtering surface which occupies a relatively small space, so arranged as to require infrequent cleaning, and, when necessary, being easily cleaned and recharged.

These and other objects will be apparent from a consideration of the following description and by reference to the accompanying drawing, in which Fig. 1 is a sectional view of a filter made in accordance with my invention;

Fig. 2 is a sectional view of a modified filter made in accordance with my invention;

Fig. 3 is an enlarged perspective view of a drainage seal washer used in connection with the filtering element; and Figs. 4, 5, 6, and 7 show modified forms of seals and drainage washers that may be used in connection with the filtering element.

It will be recognized that my improved filter is of general application, but for purposes of illustration and explanation, it will be described with reference to the purification of water for household purposes.

In the drawing, 1 represents a cylindrical casing or container which has a bottom section 2 of inverted conical shape. The central portion of the bottom section is flattened at 3 and provided with an inlet opening. An inlet conduit 4 communicates with the inlet opening and is secured to the portion 3 by means of a distributor head 5 which extends from the inside of the casing through the inlet opening and engages the conduit 4 by means of suitable threads, a washer being interposed between the bottom section and the conduit 4 to insure a water-tight connection.

The distributor head 5 is provided with a plurality of openings 6 which are preferably tangential to the vertical opening 7 in order to agitate or produce a swirling motion of the water as it enters the bottom of the container. This swirling motion of the incoming water acts to disperse the charge thoroughly throughout the container, whereby the charge forms a dense uniform cake of finely comminuted particles upon the filter charge retainer when filtration takes place. The swirling water also reagitates any loose particles of the charge which fall from the filter charge retainer to the bottom of the container, permitting them again to be deposited on the retainer, as will be described more specifically hereinafter.

The upper edge of the container 1 is turned outwardly and downwardly to form an attaching rim 8. A top 9 is removably attached to the container by means of bolts 10 extending through the peripheral portion of the top and engaging an attaching ring 11 which fits beneath the attaching rim 8. To provide a water-tight connection between the top and the container, a gasket 12 is seated in a channel in the under side of the top and presses against the rim 8.

An outlet conduit 13 is mounted in a suitable opening 14 in the top or cover 9 by means of engagement of the downwardly extending portion 15 with a threaded nut 16, a washer 17 rendering the connection water-tight. The upper portion of the outlet conduit communicates with a valved faucet 18 by which the flow of water through the filter is controlled. It will be seen that the inlet conduit 4 maintains the container full of water held under the pressure of the source of supply.

If desired, a valve may be included in the inlet conduit in addition to or in place of the valve in the outlet conduit, and it will be noted that when the valve is placed in the inlet conduit the container is under atmospheric pressure when this valve is closed.

The filter element which is used in connection with my filter is produced by covering a suitable rigid drainage member 19 with a filter cloth or other suitable retaining member 20, the free edges of which extend beyond the drainage member and are sealed.

In accordance wth a preferred form of my invention, the free edges of the cloth are formed into an integral and water-tight union 21 by means of a water insoluble adhesive agent. It is preferred to treat the free edges of the cloth with unvulcanized rubber and to vulcanize the treated edges together. The resultant union is firm, permanent and entirely water-tight.

The wire screen which constitutes the drainage member 19 in the modifications shown in the drawing is provided with an outlet opening intermediate its ends and preferably adjacent its central portion. On each side of the drainage member 19 and surrounding the outlet opening therein is mounted a drainage seal washer 22 which is secured to the screen or otherwise held in place. The drainage seal washers are provided with drainage channels 23 in order that the filtrate may pass into the outlet opening with minimum resistance.

The filter cloth extends over these drainage seal washers and is provided on each of its sides with an opening corresponding to the outlet opening in the wire screen. A headed drainage cap 24 abuts the filter cloth on one side of the drainage member 19 and has a hollow cylindrical portion 25 extending through the outlet opening in the drainage member and protruding from the opposite side of the filter element. Suitable perforations 26 are provided in the cylindrical portion 25 for drainage of the filtrate. An outlet connection 27 engages the protruding portion of the drainage cap 24 and is held in abutting relation to the filter cloth by means of threads 28.

By tightening the headed drainage cap 24 within the outlet connection 27, the filter cloth, which is preferably impregnated with rubber or similar substance about the openings, is held tightly between the drainage seal washer 22 and the outlet connection 27 on one side and between the other drainage seal washer 22 and the drainage cap 24 on the opposite side, thereby forming a water-tight joint.

The filter cloth preferably is secured about the wire drainage member 19 while the latter is in substantially flat form. After formation of the sealed union the rectangular wire screen and filter cloth are bent or formed into any suitable tortuous shape, the outside contour of which conforms substantially to the shape of the container. By forming the filter element in this manner a large surface or filter area is provided within a relatively small space. In the modifications shown in the drawing, the ends of the filter element are bent in the same direction about the central portion and then doubled back in the same direction so that the ends are adjacent the central portion. It will be understood that my object is to provide a tortuous shaped filter element and that the particular shape imparted to the filter element is immaterial. The surface presented for formation of the charge and the output of the filter is thereby greatly increased. The space between adjacent portions of the tortuous filter element are desirably made such that the layers of deposited charge on said adjacent portions will not touch or interfere with each other.

The outlet connection 27 communicates with and is rigidly connected to the outlet conduit 13 by means of a suitable threaded pipe 29. By this means the filter element is removed from the container with removal of the top, thereby making the interior of the filter easily accessible for cleaning and/or replacement of parts.

Before the filter is completely assembled, a quantity of finely divided or comminuted filter charge is preferably wetted or dampened and placed in the container. The nature and quantity of the charge will depend upon such factors as the results desired, the length of time the filter is to be used before cleaning and recharging, the closeness of adjacent surfaces of the filtering element, and the characteristics of the water to be purified. Combinations of various filtering materials may be employed as the charge, or various materials may be used alone, as will be understood by one skilled in the art. In a modification which I have found particularly desirable in the purification of water for drinking purposes, finely divided particles of activated carbon are employed as the principal element of the charge, and with the activated carbon may be combined filter aids such as a diatomaceous earth. For example, 100 grams of finely comminuted activated carbon per square foot of filtering area may be employed alone as the charge, or may be mixed with 15 grams of prepared diatomaceous earth or kieselguhr.

Where a carbonaceous charge is employed, I have found it highly desirable to wet the charge prior to closing the filter, since the finely divided carbon would otherwise remain in the filter for some time before becoming wetted by the water passing through the filter.

As shown in the modification of Fig. 2 the outlet connection from the filter element may be formed at the outlet opening of the drainage member by the use of a sealing member 34 having two outwardly extending lugs 35 that are bent backwardly and inserted through the screening member 19. A corrugated drainage washer 36 may be inserted between the sealing member 34 and the drainage member and held in place by slotted ears 37 fitting over the lugs 35. On the other side of the drainage member a further corrugated washer 36 may be mounted in the same way on lugs 35 and a final sealing member 38 having slotted ears 39 is fitted thereover. The ends of the lugs 35 are then bent outwardly holding the assembly in place.

The cap member 40 has a stud 41 that extends through the assembly and is screwed into a holding portion 42 of the outlet connection 27. The stud is of substantially less diameter than the opening through the drainage member allowing a maximum of flowage of filtrate to the outlet connection. The corrugated washers 36 have center openings of substantially the same size as the drainage member opening. The sealing member 34 also has a similarly sized center opening. The sealing member 38 may have a small opening of a size merely large enough to admit of the insertion of the link 41 therethrough.

Consequently the filtrate may pass between the drainage washers and to the outlet connection with a minimum of resistance. The holding member 41 is spaced from the drainage outlet assembly for this purpose.

In operation, the inlet conduit is mounted to a suitable pressure line, such as a city supply system, and water is introduced into the container under pressure. Due to the swirling and agitating motion produced in the water as it enters the container, the finely divided charge is agitated from the bottom of the container and dispersed in the water as it rises in the container. The differential pressure set up when the faucet 18 is opened causes the water to pass through the filter cloth 20 and to travel along the drainage member 19 to the outlet opening, from which the filtrate passes through the outlet connection 27 and into the outlet conduit. Passage of the water through the filter cloth causes the suspended particles of the charge to be hydrostatically deposited on the filter cloth, thereby forming a uniform layer 32 which covers the filter cloth. Thereafter, the water must pass through the layer of the charge before passing through the filter cloth. Thus, the impurities of the water are retained on the charge rather than on the filter cloth. Although the particles of the charge are unconfined, I have found that once these particles form a layer over the filter cloth there is little tendency for the charge to drop off and fall to the bottom of the container. In case any of the charge does fall to the bottom of the container, the swirling motion of the incoming water reagitates this portion of the charge and causes it to return to the filter cloth. Thus, there is provided a filter having a large effective filter area covered with a uniform layer of a hydrostatically deposited charge which removes from the water color, taste, and odor-forming bodies, as well as suspended solids.

When the flow of the apparatus is reduced below the desired rate by the accumulated impurities removed from the water, the top of the filter may be removed and with it the filter element. The filter element may then be placed under a flowing stream of water whereby the filter charge and impurities are washed from the filter cloth. To recharge the apparatus, it ordinarily is necessary merely to add a fresh filter charge to the container and replace the filter element and top, replacement of the filter cloth usually being unnecessary. The fresh charge is desirably furnished to users of the apparatus in a dampened condition and sealed in a suitable container.

In many municipal water systems the water is treated with a relatively large quantity of chlorine which remains in the water and imparts a disagreeable taste thereto. My filter is operable to remove the taste of chlorine from the water when a carbonaceous charge is employed, thereby rendering the water desirable for drinking purposes.

Due to the large filter area presented in my filter, the rate of flow is considerably higher than in prior filters occupying a similar space. This filter area also provides a large surface for the deposit of water impurities whereby their accumulation per unit area is sufficiently slow to permit extended periods of operation before the rate of filtration decreases to an unsatisfactory point.

The filter cloth or other charge retainer employed is preferably sufficiently porous to permit a free flow and sufficiently retentive to prevent passage therethrough of solid particles of the charge. By sealing the free edges of the filter cloth with a water insoluble adhesive agent, particles of the charge and unfiltered water are prevented from passing between adjacent edges of the filter cloth without passing through the charge.

It is preferred to locate the outlet conduit for the filter element adjacent the central portion thereof in order that the filtrate from each half of the filter element will have substantially the same distance to travel, thus distributing the differential pressure and resistance.

Many variations of my invention will occur to one skilled in the art and such modifications as come within the spirit of my invention are intended to be included in the appended claims.

I claim:

1. The combination with a filter having a filter element including a drainage member and a sealed filter medium enclosing the same and having a drainage opening spaced from the edges of said drainage member, of a drainage outlet fitting for said element including a cap member abutting one wall of said medium and sealing one end of said opening, a linking member attached to said cap member and extending through said opening, a filtrate outlet member attached to said linking member and abutting the other wall of said filter medium around said opening, drainage seal washers disposed between said filter medium and said drainage member and around but spaced from said linking member.

2. The combination with a filter having a filter element including a drainage member having a drainage opening therein intermediate its edges and a sealed filter medium enclosing the same and having an opening in alignment with said drainage opening, of a drainage outlet fitting for said element, including a supporting member, a linking member attached to said supporting member and extending through said openings, a filtrate outlet connection abutting one wall of said filter member and held thereto by said link and supporting member, and drainage washers between the walls of said filter medium and said drainage member around said openings and spaced from said link member.

3. In a filtering device having a filter element, an outlet for said filter element including a drainage member having an opening therein, a sealing washer mounted adjacent said opening and having lug portions extending through said drainage member, a drainage washer on either side of and against said drainage member and attached to said lug portions and a further sealing washer attached to said lug portions, said lug portions being bent to hold the assemblage together adjacent said drainage opening.

HERBERT L. DICK.